US010402633B2

(12) United States Patent
Tang et al.

(10) Patent No.: US 10,402,633 B2
(45) Date of Patent: Sep. 3, 2019

(54) HUMAN DETECTION IN HIGH DENSITY CROWDS

(71) Applicant: Intel Corporation, Santa Clara, CA (US)

(72) Inventors: Shaopeng Tang, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/521,512

(22) PCT Filed: May 23, 2016

(86) PCT No.: PCT/CN2016/082955
§ 371 (c)(1),
(2) Date: Apr. 24, 2017

(87) PCT Pub. No.: WO2017/201638
PCT Pub. Date: Nov. 30, 2017

(65) Prior Publication Data
US 2018/0189557 A1 Jul. 5, 2018

(51) Int. Cl.
*G06K 9/00* (2006.01)
*G06T 7/11* (2017.01)
(Continued)

(52) U.S. Cl.
CPC ..... *G06K 9/00362* (2013.01); *G06K 9/00335* (2013.01); *G06T 7/11* (2017.01);
(Continued)

(58) Field of Classification Search
CPC .................................................. G06K 9/00778
See application file for complete search history.

(56) References Cited

U.S. PATENT DOCUMENTS

2005/0201612 A1\* 9/2005 Park .................. G06K 9/00778
382/154
2011/0255741 A1\* 10/2011 Jung .................. G06K 9/00369
382/103
(Continued)

FOREIGN PATENT DOCUMENTS

CN 103389042 A 11/2013
CN 103646250 A 3/2014
(Continued)

OTHER PUBLICATIONS

Chen, Li, et al. "People counting using iterative mean-shift fitting with symmetry measure." Information, Communications & Signal Processing, 2007 6th International Conference on. IEEE, 2007.\*
(Continued)

*Primary Examiner* — Bobbak Safaipour
(74) *Attorney, Agent, or Firm* — Schwabe, Williamson & Wyatt, P.C.

(57) ABSTRACT

The present disclosure describes a non-learning based process and apparatus for detecting humans in an image. This may include receiving an image that has pixel distance information from a camera and using that to determine a height of the pixel above a ground surface. One or more regions may then be identified that may include a head and shoulders of an individual in the image. A multiple threshold technique may be used to remove some background regions, and a mean-shift technique used to find the local highest regions that may be combination of head and shoulders of the person. In embodiments, the view angle and/or the height of the camera may not be fixed.

20 Claims, 10 Drawing Sheets

(51) Int. Cl.
*H04N 7/18* (2006.01)
*H04N 13/204* (2018.01)

(52) U.S. Cl.
CPC ..... *H04N 7/18* (2013.01); *G06T 2207/10012* (2013.01); *G06T 2207/20021* (2013.01); *G06T 2207/30196* (2013.01); *H04N 13/204* (2018.05)

(56) References Cited

U.S. PATENT DOCUMENTS

| | | | | |
|---|---|---|---|---|
| 2013/0155229 | A1* | 6/2013 | Thornton | H04N 7/18 348/143 |
| 2013/0169822 | A1* | 7/2013 | Zhu | G06T 7/80 348/180 |
| 2013/0182114 | A1 | 7/2013 | Zhang et al. | |
| 2014/0192144 | A1* | 7/2014 | St. Clair | H04N 5/23238 348/36 |
| 2014/0328512 | A1* | 11/2014 | Gurwicz | G06K 9/6263 382/103 |
| 2014/0347475 | A1* | 11/2014 | Divakaran | G06K 9/00771 348/135 |
| 2016/0133025 | A1* | 5/2016 | Wang | G06K 9/00778 348/135 |
| 2016/0283798 | A1* | 9/2016 | Goldner | G06K 9/00778 |

FOREIGN PATENT DOCUMENTS

| | | |
|---|---|---|
| JP | 2006046961 A | 2/2006 |
| JP | 2009109508 A | 5/2009 |

OTHER PUBLICATIONS

Huber, Samuel, and Peter Wellig. "Human factors of target detection tasks within heavily cluttered video scenes." Target and Background Signatures. vol. 9653. International Society for Optics and Photonics, 2015.*

International Search Report and Written Opinion dated Feb. 9, 2017 for International Application No. PCT/CN2016/082955, 11 pages.

* cited by examiner

HUMAN DETECTION IN HIGH DENSITY CROWDS

CROSS REFERENCE TO RELATED APPLICATIONS

The present application is a national phase entry under 35 U.S.C. § 371 of International Application No. PCT/CN2016/082955, filed May 23, 2016, entitled "HUMAN DETECTION IN HIGH DENSITY CROWDS", which designated, among the various States, the United States of America. The Specifications of the PCT/CN2016/082955 Application is hereby incorporated by reference.

FIELD

Embodiments of the present disclosure generally relate to the field of image processing. More specifically, embodiments of the present disclosure relate to devices and methods for detecting persons within an image of a high density crowd.

BACKGROUND

Human detection within an image continues to gain more attention from academia and industry due to applications in video surveillance, content-based image/video retrieval, video annotation, human-computer interaction, and so forth. Legacy research on this topic has considered human detection from RGB images using learning techniques, which have involved Histogram of Oriented Gradients features, Deformable Part-based Model, and Convolutional Neural Networks. Differences between public datasets that include trained samples used for learning and more complicated real scenarios of images exist create challenges in recognition quality. Furthermore, full-body based human detection may be difficult in images with high density crowds were one body may occlude another.

BRIEF DESCRIPTION OF THE DRAWINGS

Some of these challenges may be remediated through embodiments in which one or more cameras at various heights and at various angles capturing images of people may be used to identify head and shoulders combinations, and doing so without using learning-based or other artificial intelligence-based techniques. Depth-sensor cameras including Real Sense™ from Intel, as well as Kinect™ and Xtion™ are currently available and provide image depth information at the pixel level that may be used as a cue for detecting people in an image.

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

This disclosure may include a non-learning based process and apparatus for detecting persons in an image, including an image of a high density crowd. In embodiments, this may include using pixel depth information in images captures by a depth-sensing camera to determine a height of an object represented by a pixel above a ground surface. In embodiments, this pixel height may be used to identify one or more regions that may include a head and shoulders of a person in a crowd. In embodiments, this may be accomplished by a height conversion process to convert the depth value of a pixel to the height value above the ground surface, which may use a pre-calculated conversion map to store the values needed for the conversion. A multiple threshold technique may be used to remove some background regions, and a means-shift technique may be used to find the local highest regions that may represent a head and shoulders combination of a person. This information may be used to count the number of people within an area, or may be used to track an individual person's movement through the area using closely-timed sequences of images. In embodiments, the view angle and/or the height of the camera is not fixed. Aspects of this disclosure may not require a learning technique or other artificial intelligence-based technique to be employed.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The term "computer-readable storage media" may refer to, be a part of, or otherwise include media on which data, including instructions of a module that may be executed, may reside. Computer-readable storage media may be either transitory, or non-transitory.

Various operations are described as multiple discrete operations in turn, in a manner that is most helpful in understanding the claimed subject matter. However, the order of description should not be construed as to imply that these operations are necessarily order dependent.

Figure 1:
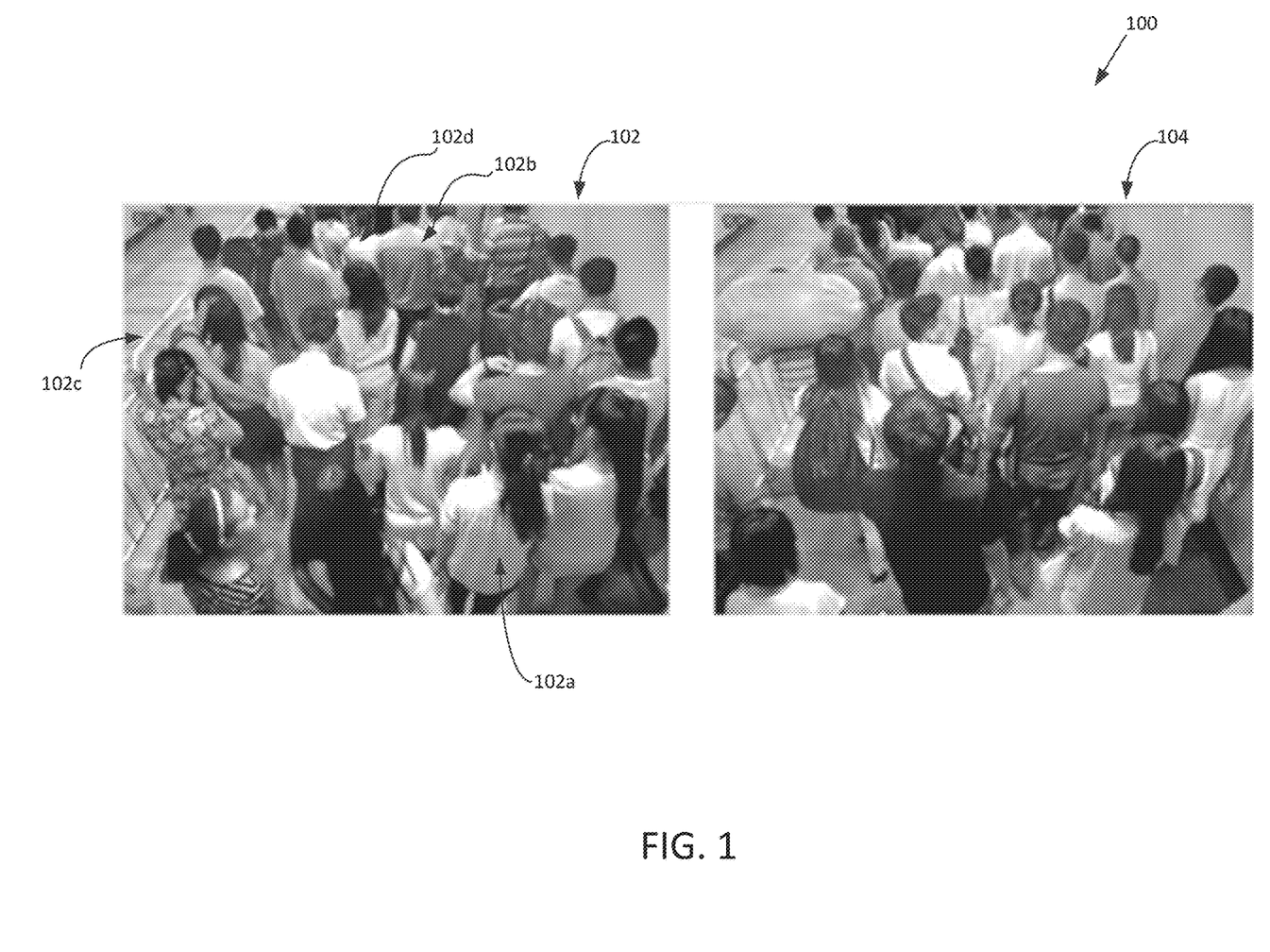
FIG. 1 shows an example of two images captured from a camera of a crowd of people walking down a hallway, in accordance with various embodiments.

FIG. 1 shows an example of two images captured from a camera of a crowd of people walking down a hallway, in accordance with various embodiments. Diagram 100 shows a first image 102 taken by a depth-sensing camera (not shown) attached to a ceiling of a hallway and angled such that a large portion of the hallway, and the people walking in it, may be viewed in the resulting image 102. Because of the angle at which the cameras positioned, the image 102 may appear somewhat distorted. For example, a first person 102a walking in the foreground of the image 102 may appear taller than a second person 102b walking in the distance, even though the second person 102b is taller than the first person 102a. In addition, the height of a railing 102c may appear taller than the height of the third person 102d, even though the third person 102d may be much taller than the height of the railing 102c.

A second image 104, taken by the same camera used to capture the first image 102, similarly shows individuals walking down the same hallway. In embodiments, the second image 104 may be an image captured very close in time to when the first image 102 was captured.

Both the first image 102 and the second image 104 may contain metadata that may describe, for each pixel, the distance of the person/thing of the pixel from the camera used to capture the image. As discussed below, those distances may be used to determine the height of the person/thing of each pixel above a ground surface and to determine the likely presence of a person by determining groups of pixel height values clustered in a way that may appear to be heads and shoulders of people. [Note: hereinafter, a person or a thing within an image may be collectively referred to as an object within an image.]

Figure 2:
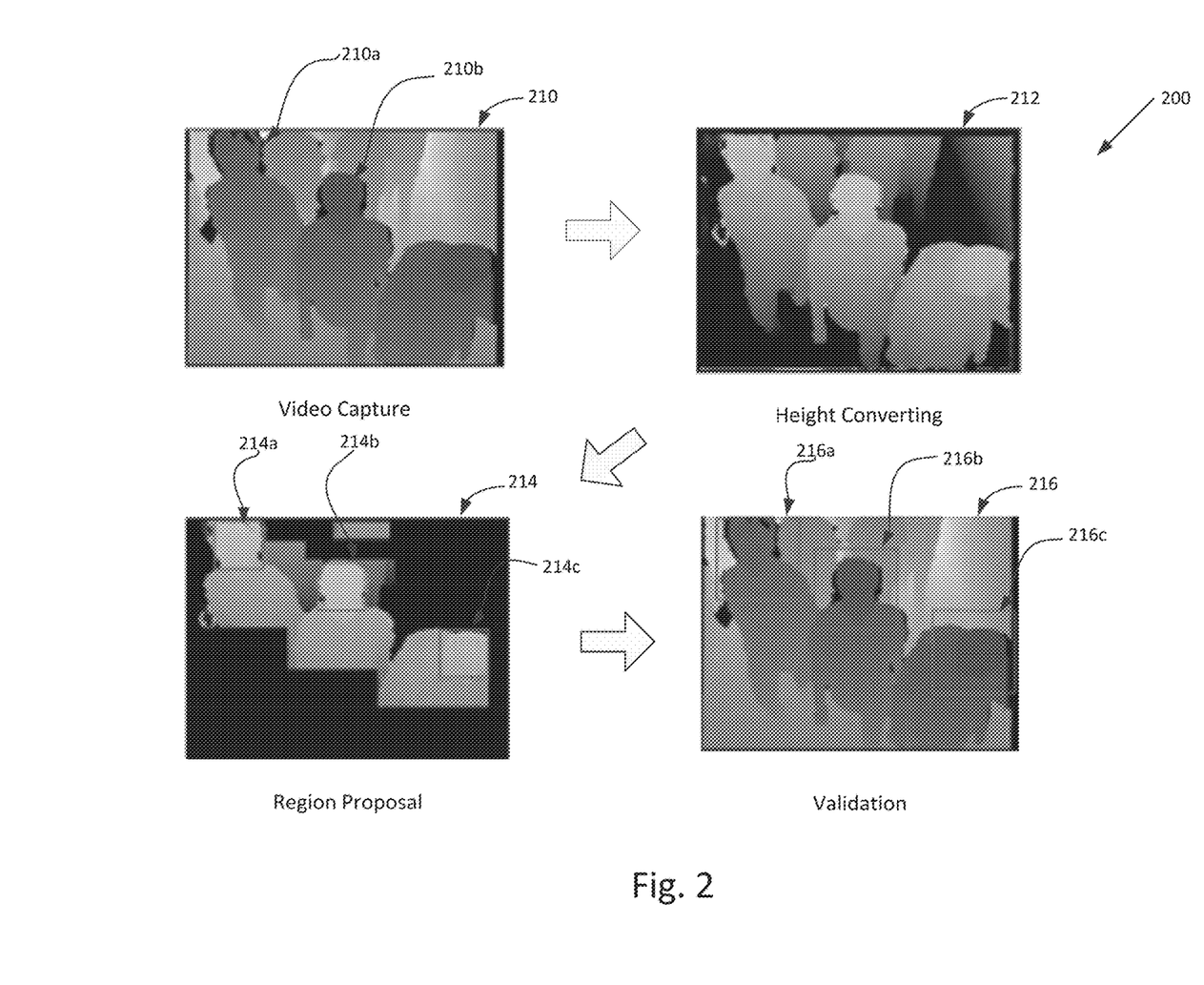
FIG. 2 illustrates example stages in a process of determining a human in an image using head and shoulder detection, in accordance with various embodiments.

FIG. 2 illustrates example stages in a process of determining a human in an image using head and shoulder detection, in accordance with various embodiments. Diagram 200 shows a series of images 210-216 that illustrate one embodiment of a framework for detecting human head and shoulder combinations within an image.

Diagram 210 shows a portion of a captured image that has been rendered into grayscale. The individual pixels within the image have associated depth information that may describe, in a non-limiting embodiment, the physical distance between physical location of the object depicted by that pixel and the camera that captured the image. In other embodiments, the depth information may be in relation to one or more other objects.

Diagram 212 shows a portion of the captured image of diagram 210, where the individual pixels of the image have been converted to heights above the ground surface. In embodiments, this may be performed by the height conversion module 850 of FIG. 8 or of block 906 of process 900 shown in FIG. 9. In embodiments, a ground surface may be a floor, or some other service on which people may walk or on which things may be set. In diagram 212, the ground surface is the floor of the hallway. In embodiments, the ground surface may not necessarily be level. In a non-limiting example, the hallway ground surface on which the people 210a, 210b are walking may be either gently sloping up or sloping down, in part or in whole.

Non-limiting embodiments for height conversion are further described in FIGS. 3-6 below. In embodiments, a conversion from depth value to the height value for each pixel may occur under the condition that the view angle of camera may be varied.

Diagram 214 shows an example of a portion of the captured image of diagram 212, where identified regions 214a, 214b, 214c may indicate the presence of a person within the image. In embodiments, a mean-shift method may be used to identify cluster centers that may represent the local highest regions of objects depicted within the image. In embodiments, these regions may be considered to be proposed regions. Proposed regions and their process are further discussed in FIG. 7 below. In embodiments, these proposed regions may be assigned a unique identifier (not shown).

Diagram 216 shows an example of a portion of the captured image of diagram 214, where proposed regions 216a, 216b, 216c have gone through a validation process that removes a proposed region from consideration if there is a false detection of a person in the proposed region. In embodiments, validation process may be optional. In embodiments, validation may include template matching. In other embodiments, area and height thresholds based upon the proposed regions and/or the pixel metadata within the proposed regions, including height information, may be used for validation. In one non-limiting example, thresholds for the area and/or heights of acceptable regions may be determined and then applied to those identified regions. Those identified regions whose area and/or height falls within threshold values may be selected as a final person identification result. For example those proposed regions having an average height above 8 feet (potentially denoting such as skis carried by a person) or less than 4 feet (potentially denoting such as a luggage cart being pushed by a person) may be rejected.

In embodiments, selected regions within an image may be used in a number of different ways. In embodiments where the selected regions may represent individual persons, these people may be counted within a specific area within the camera field of view, for example within a rectangular area on the ground surface. In embodiments, this process may be used over time to determine how crowded particular area is at a particular time of day or coincident with a particular event. Or, in embodiments this process may be used to determine a flow rate of pedestrian traffic over time.

In other non-limiting embodiments, multiple images captured over a short period of time for example every quarter or half second, may allow for the identifying and tracking an individual's path as a person moves through a location.

Figure 8:
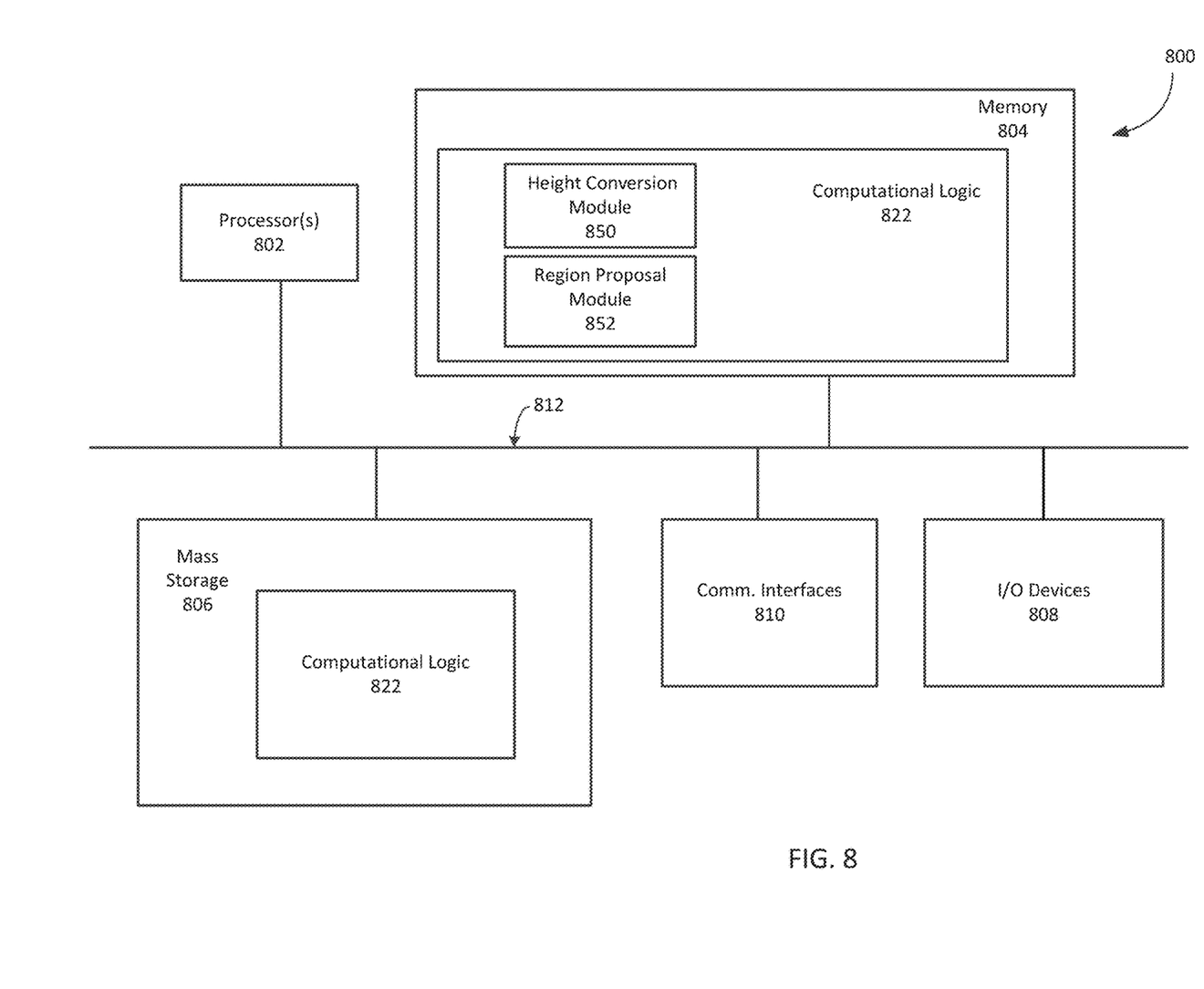
FIG. 8 illustrates an example computing system suitable for practicing various aspects of the disclosure, in accordance with various embodiments.
Figure 9:
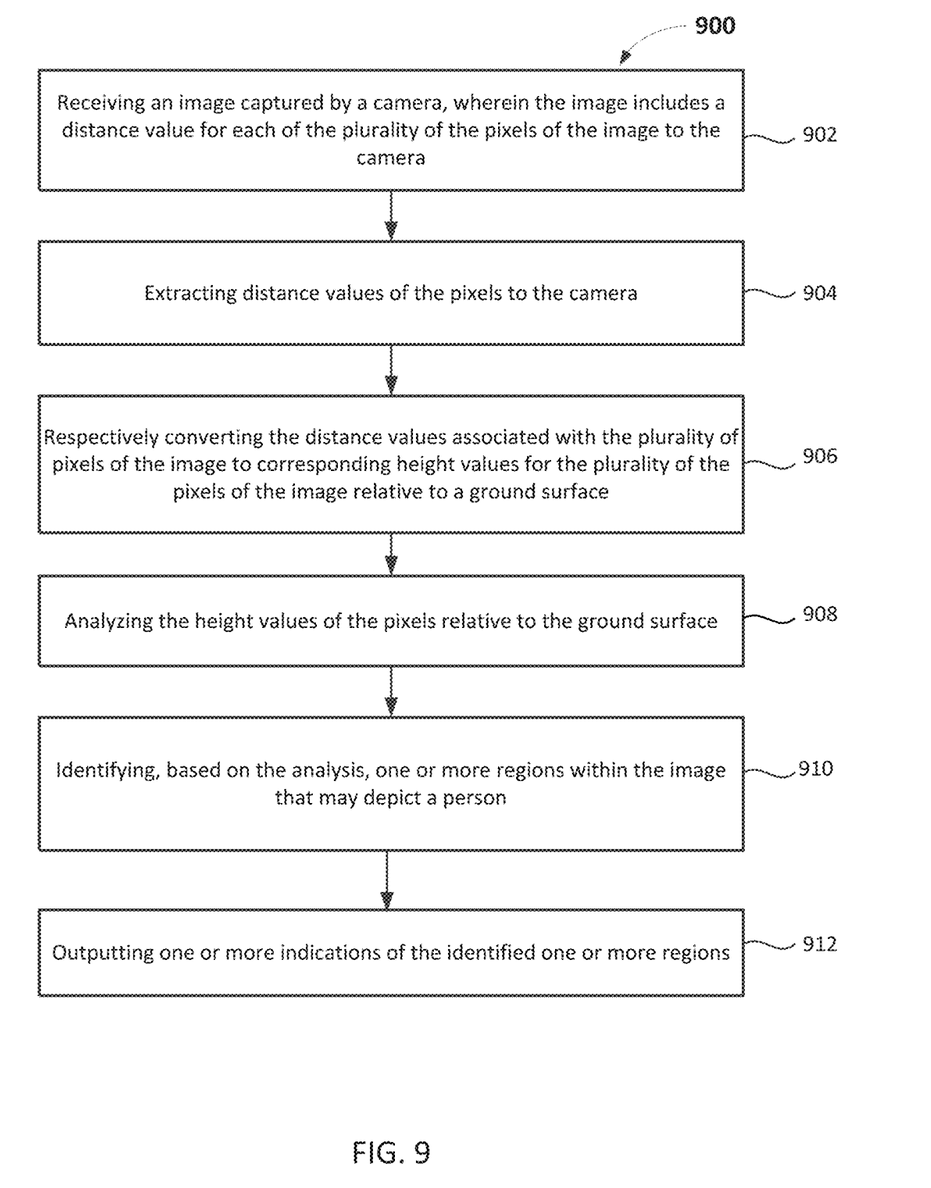
FIG. 9 illustrates an example process for human detection in high density crowds, in accordance with various embodiments.

In embodiments, the activities described in diagrams 214 and 216 may be performed by the region proposal module 852 of FIG. 8 or of any of blocks 908-910 of process 900 shown in FIG. 9

Figure 3:
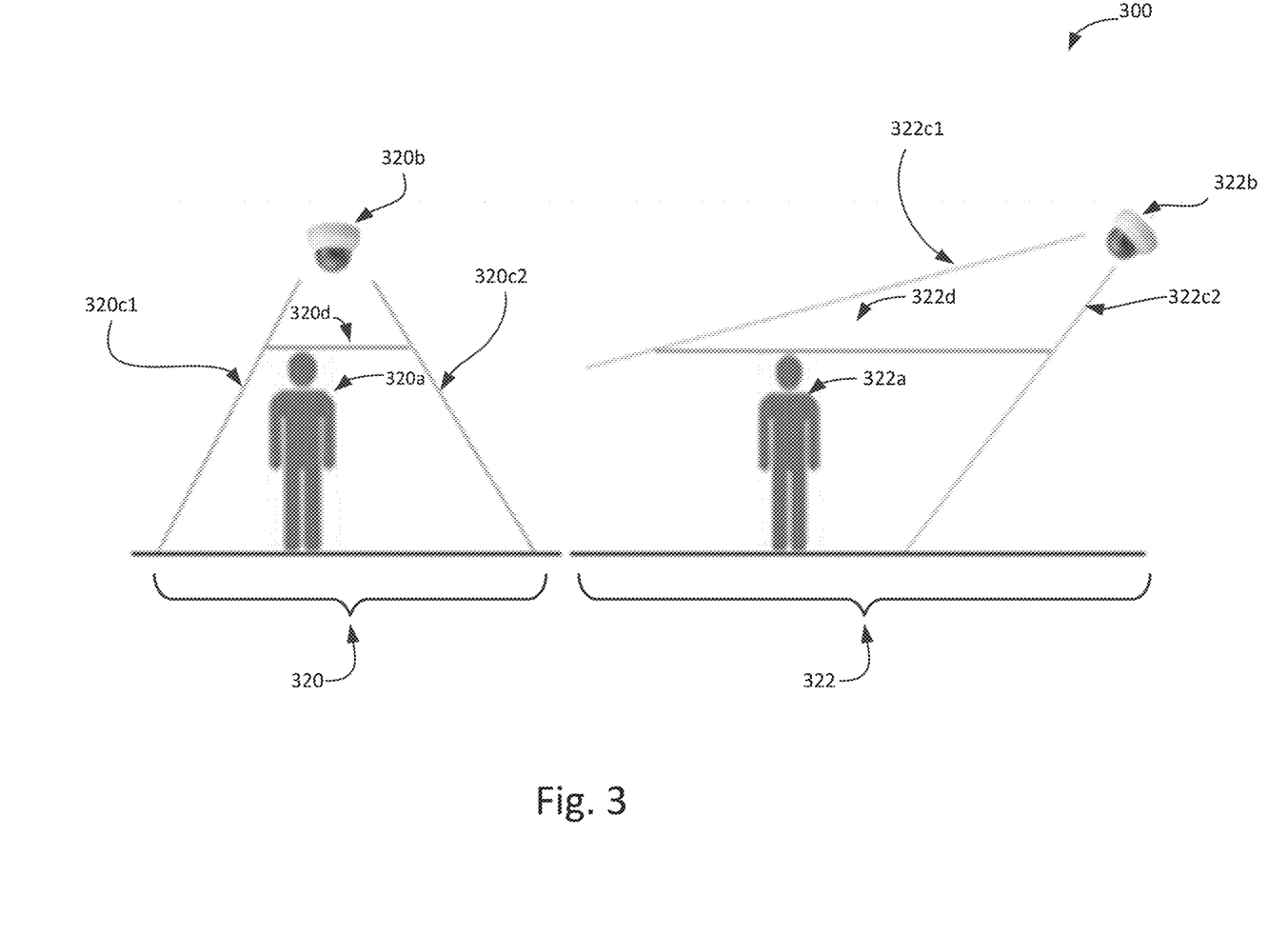
FIG. 3 illustrates different camera angles used to capture different valid regions to identify a human, in accordance with various embodiments.

FIG. 3 illustrates different camera angles used to capture different valid regions to identify a human, in accordance with various embodiments. In embodiments, the disclosures of FIG. 3 may be related to FIG. 2 diagram 212. Diagram 300 shows a first example 320 of capturing an image of a person 320a using an overhead camera 320b that points substantially downward, and a second example 322 of capturing an image of a person 322a using an overhead camera 322b that points at an angle.

In the first example 320, the camera 320b is placed in a top-down view and may be used for the head-shoulder detection by using metadata of each pixel within the image. By accounting for the distance between the camera 320b and the ground, the height conversion of the object that each pixel represents may be determined, for example, by subtraction the distance of object of the pixel from the height of the camera above the ground surface. Although this example 320 may have a less complicated procedure for height conversion, because the camera 320b has a bounded field of view 320c1, 320c2 the range of the detection area 320d may be quite small. In this example, the detection area 320d may be increased by raising the height of the camera 320h, which may not be practical given the dimensions of the room to be monitored. The detection area may also be increased by increasing the number of cameras used within the room.

In the second example 322, the camera 322b is placed at an angle, having a bounded field of view of 322c1, 322c2 which results in a larger range of detection area 322d. Although the process of height conversion to determine the presence of a person 322a may be more complicated than in the first example 320, the increased area of detection 322d may require fewer cameras overall to achieve a wider coverage. It may also allow operation in areas having a low ceiling height. In embodiments, the angle of the camera 322b may be adjusted, particularly when used in conjunction with other cameras (not shown), to increase the detection area for people.

Figure 4:
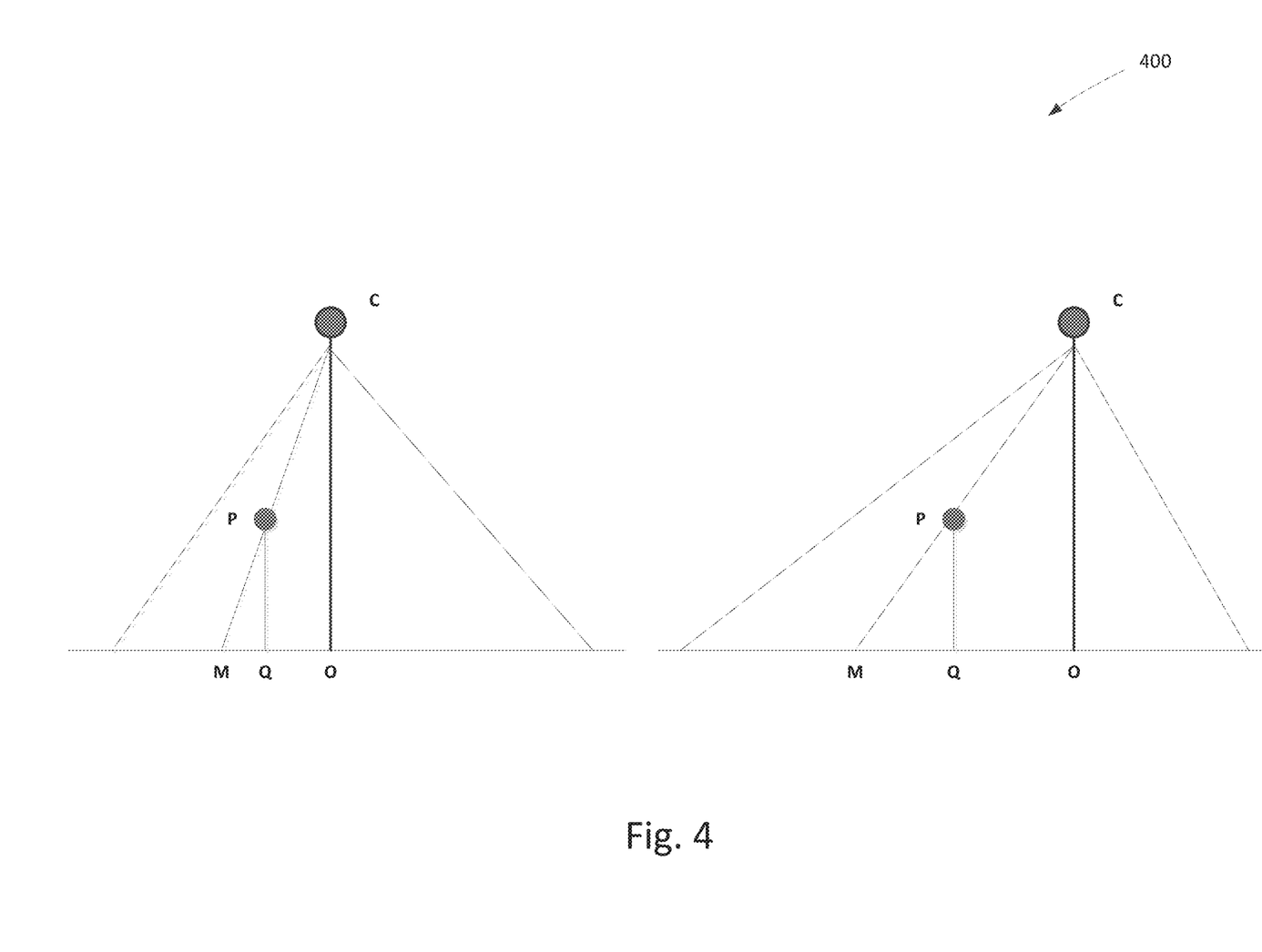
FIG. 4 illustrates two examples of calculating the height value of a pixel of an image, in accordance with various embodiments.
Figure 5:
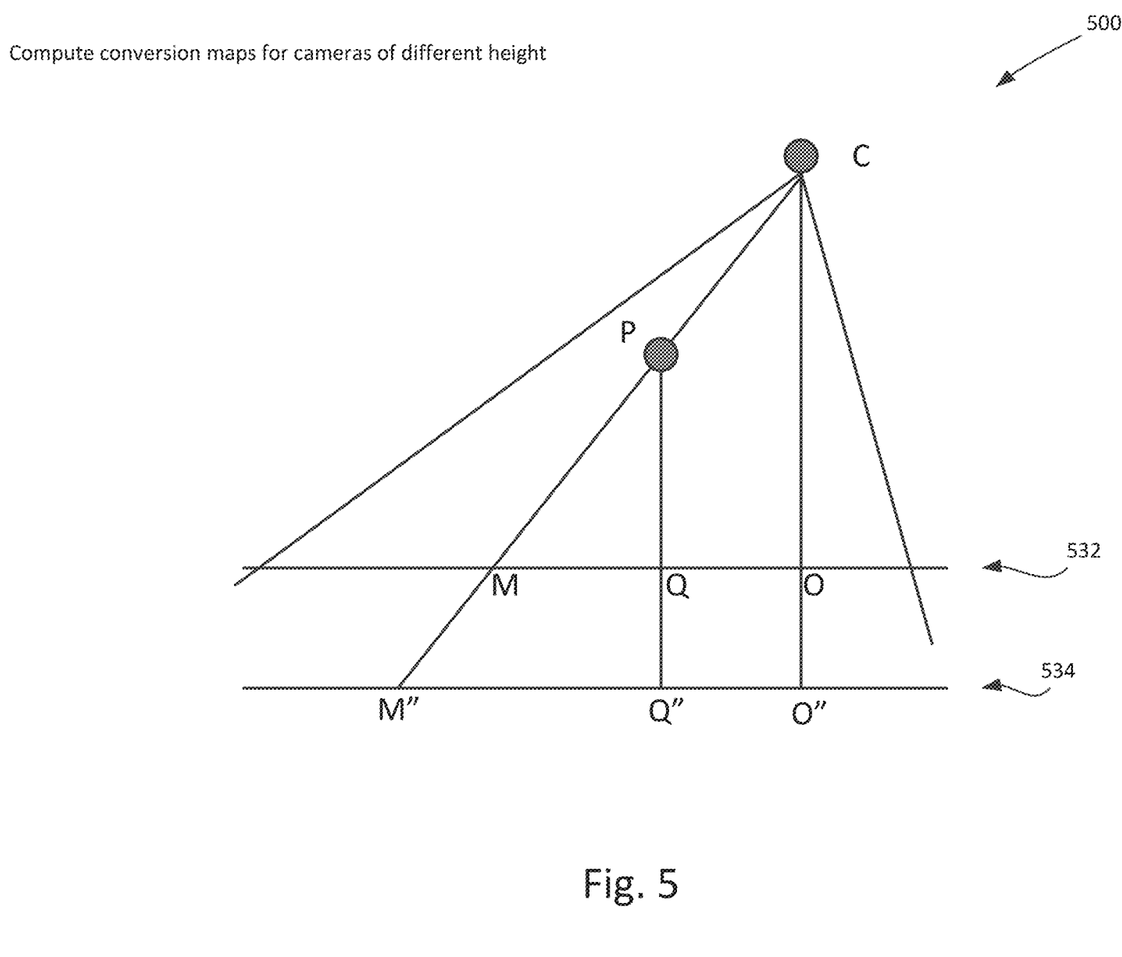
FIG. 5 illustrates an example of computing a conversion map to use with cameras of differing heights, in accordance with various embodiments.

FIG. 4 illustrates two examples of calculating the height value of a pixel of an image, in accordance with various embodiments. Diagram 400 illustrates two camera placement scenarios that show different relationships between a camera. C and a person P to be identified in an image captured by a camera C. In the descriptions of FIG. 4 and FIG. 5, the term DXY may represent the distance in physical space between a point X and a point Y, e.g., DCM may represent the distance in physical space between the point C and the point M. The term HXY may represent the height in physical space of a point X above a point Y that is on a ground surface, e.g., Hco may represent the distance in physical space between the point C and the point O.

In embodiments, the height value $H_{PQ}$ may be determined by using equation 1.

$$H_{PQ} = \frac{D_{CM} - D_{CP}}{D_{CM}} \times H_{CO} \quad (1)$$

Where $D_{CP}$ is the pixel value in depth frame for points C and P and $H_{CO}$ is the height value of camera C above the ground (between points C and O). In embodiments, to determine DCM, HPQ is computed. In embodiments, a conversion map may be generated that may store the value of DCM for each pixel.

In embodiments, the conversion map is computed based at least in part on the height of the camera C and the view angle. In practices, the height of the camera may not be determined before installation, so the following method may be practiced to ensure that the conversion map is not related to the camera height when the view angle is fixed. These embodiments are further described in FIG. 5.

FIG. 5 illustrates an example of computing a conversion map to use with cameras of differing heights, in accordance with various embodiments. FIG. 500 illustrates a camera C that may be placed at various heights above a first ground surface 532 and a second ground surface 534.

In embodiments, the value of DCM is not stored in the conversion map because this value is variable when the camera height is variable. Instead, the ratio of DCM and HCO as described in Equation 2 may be stored in the conversion map and may then be used to calculate the DCM by using the camera height after installation.

$$ratio_M = \frac{D_{CM}}{H_{CO}} = \frac{D_{CM''}}{H_{CO''}} \quad (2)$$

Therefore, in embodiments, only one conversion map may need to be used for the height conversion process for one view angle despite the height of the camera being variable.

Figure 6:
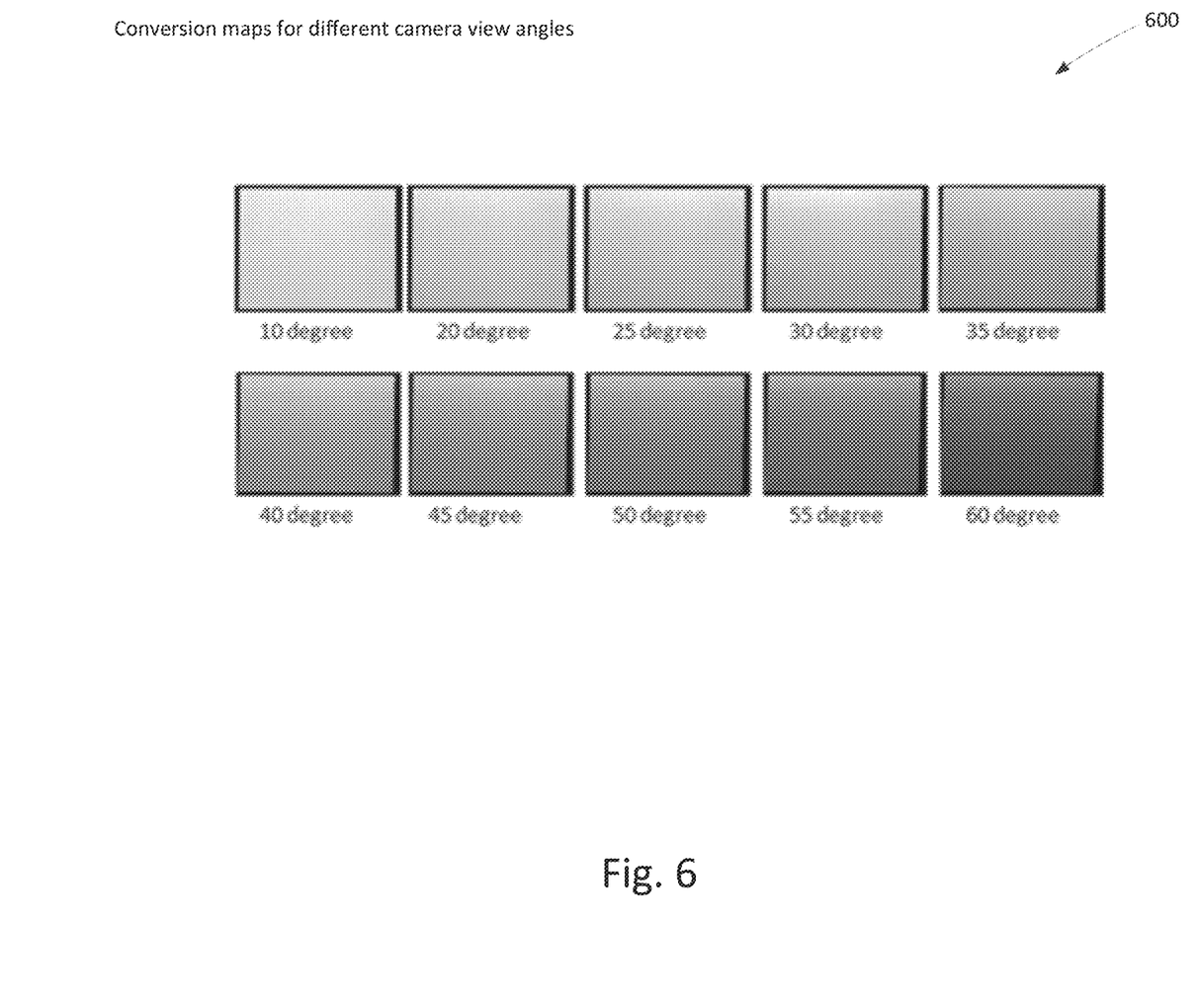
FIG. 6 shows different examples of conversion maps for different view angles of cameras, in accordance with various embodiments.

FIG. 6 shows examples of conversion maps for different view angles of the camera C. In embodiments, the values of the DCM-to-HCO ratio in different camera view angles may be varied for the same pixel in a conversion map. In embodiments where the camera view angle is fixed, a ratio value may be pre-computes and scaled to, for example, [0-255] for each pixel to get the conversion map for the camera view angle. In embodiments, conversion maps may be computed for multiple angles.

Figure 7:
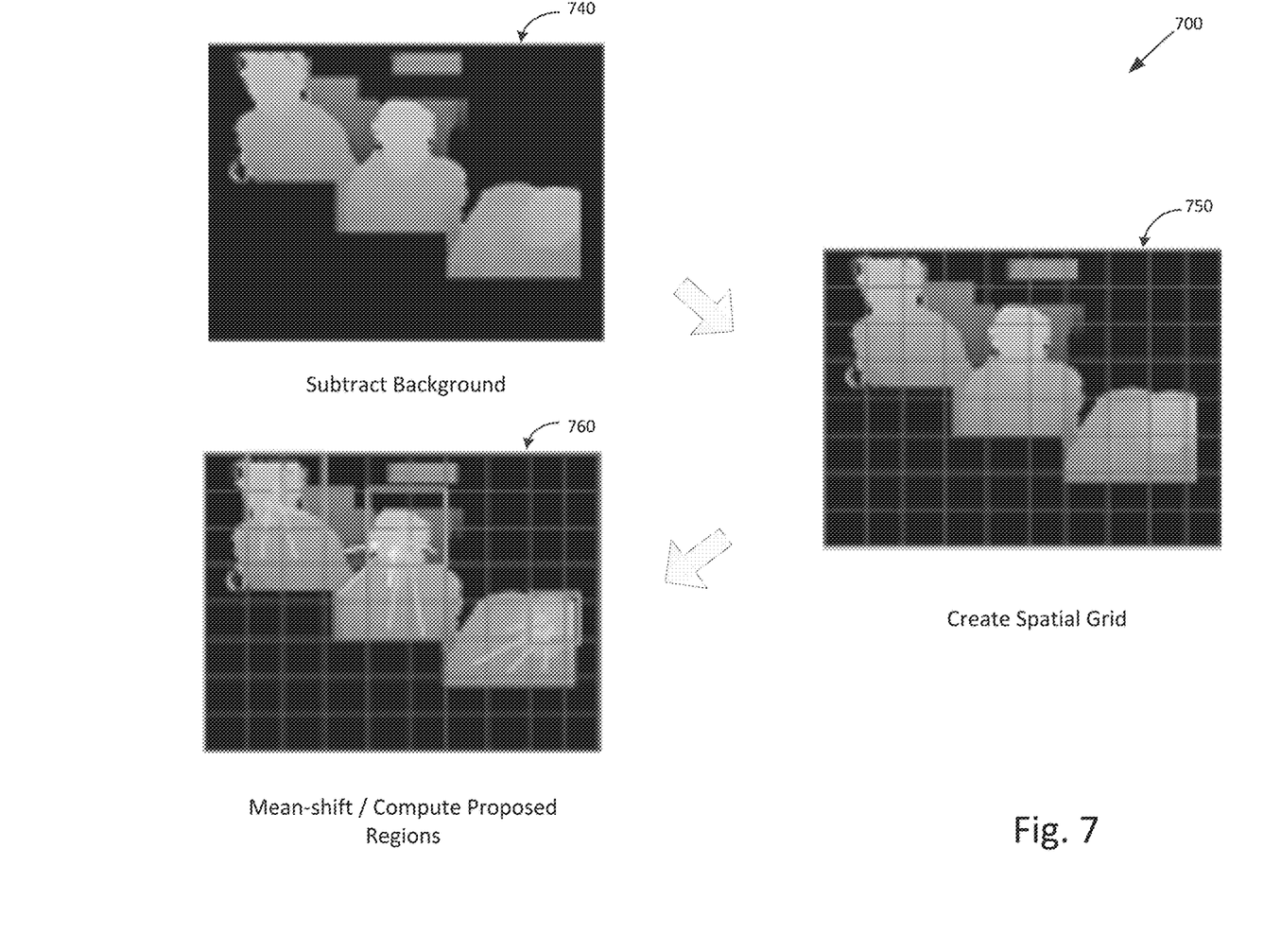
FIG. 7 illustrates example stages in a process of determining proposed region that may identify a human, in accordance with various embodiments.

FIG. 7 illustrates example stages in a process of determining one or more proposed regions that may identify a human, in accordance with various embodiments. Diagram 700 may show three events that may be used to determine a one or more proposed regions. Subtract background event 740, create spatial grid event 750 and mean-shift computation event 760. In embodiments, an assumption that the shape of the human body is like a mountain peak may be made. Therefore, local highest regions may be considered as the proposal regions.

Diagram 740 may represent a subtract background event. In embodiments, multiple height thresholds are used to remove some background regions coarsely.

Diagram 750 may represent the creation of a spatial grid. In embodiments, the image may be divided into cells uniformly in the spatial space and the average height value of each cell is calculated.

Diagram 760 may represent identifying proposed regions by performing a mean-shift function to each cell. In embodiments, the cluster centers returned by the mean-shift method are the local highest regions and can be considered as the proposal regions for human head and shoulder combination.

FIG. 8 illustrates an example computing device 800 suitable for use to practice aspects of the present disclosure, in accordance with various embodiments. For example, the example computing device 800 may be suitable to implement the functionalities associated with diagrams 210, 212, 214, 216, 740, 750, and/or 760.

As shown, computing device 800 may include one or more processors 802, each having one or more processor cores, and system memory 804. The processor 802 may include any type of unicore or multi-core processors. Each processor core may include a central processing unit (CPU), and one or more level of caches. The processor 802 may be implemented as an integrated circuit. The computing device 800 may include mass storage devices 806 (such as diskette, hard drive, volatile memory (e.g., dynamic random access memory (DRAM)), compact disc read only memory (CD-ROM), digital versatile disk (DVD) and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 800 may further include input/output (I/O) devices 808 such as a display, keyboard, cursor control, remote control, gaining controller, image capture device, one or more three-dimensional cameras used to capture images, and so forth, and communication interfaces 810 (such as network interface cards, modems, infrared receivers, radio receivers (e.g., Bluetooth), and so forth). I/O devices 808 may be suitable for communicative connections with three-dimensional cameras or user devices. In some embodiments, I/O devices 808 when used as user devices may include a device necessary for implementing the functionalities of receiving an image captured by a camera as described in reference to FIG. 1.

The communication interfaces 810 may include communication chips (not shown) that may be configured to operate the device 800 in accordance with a Global System for Mobile Communication (GSM), General Packet Radio Service (CPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations and functionalities associated with diagrams 210, 212, 214, 216, 740, 750, and/or 760, generally shown as computational logic 822. Computational logic 822 may be implemented by assembler instructions supported by processor(s) 802 or high-level languages that may be compiled into such instructions.

In embodiments, the Computational Logic 822 may contain a height conversion module 850, which may perform one or more of the functions associated with FIG. 2 diagram 212, or with FIGS. 3-6. Computational Logic 822 may contain a region proposal module 852, which may perform one or more of the functions associated with FIG. 2 diagrams 214 or 216, or with FIG. 7 diagrams 740, 750, or 760.

The permanent copy of the programming instructions may be placed into mass storage devices 806 in the factory, or in the field, though, for example, a distribution medium (not shown), such as a compact disc (CD), or through communication interfaces 810 (from a distribution server (not shown)).

FIG. 9 illustrates an example process for human detection in high density crowds, in accordance with some embodiments. The process 900 may be performed, for example, by the system 800 (e.g., computing device) configured to implement the height conversion module 850 and the region proposal module 852, described in reference to FIGS. 1-7.

The process 900 may begin at block 902, and include receiving an image captured by a camera, wherein the image includes a distance value for the object of each of the plurality of the pixels of the image to the camera. In embodiments, this may include receiving an image in a digital format that is captured by a three-dimensional camera, where the captured image contains metadata regarding the image that includes a depth value for least some of the pixels of the image. In embodiments, the depth value for each pixel may be a distance value from the object represented by that pixel to the camera, or to some other reference point. The metadata may be stored within the digital information of the image, or may be stored in a location outside of the digital information image but associated with the image.

At block 904, the process 900 may include extracting distance values of the objects of the pixels to the camera. In embodiments, this may involve accessing the metadata information that includes the depth value for least some of the pixels of the image.

At block 906, the process 900 may include respectively converting the distance values associated with the objects of the plurality of pixels of the image to the camera to corresponding height values for the objects of the plurality of the pixels of the image relative to a ground surface. In embodiments, this may include the functionality described for FIG. 2 diagrams 212 and/or FIGS. 4-6.

At block 908, the process 900 may include analyzing the height values of the objects of the pixels relative to the ground surface. In embodiments, this may include the functionality described for FIG. 2 diagram 214 and/or FIG. 7 diagrams 740, 750, and/or 760.

At block 910, the process 900 may include identifying based on the analysis, one or more regions within the image that may depict a person. In embodiments, this may include the functionality described for FIG. 2 diagram 214 and/or FIG. 7 diagrams 740, 750, and/or 760.

At block 912, the process 900 may include outputting one or more indications of the identified one or more regions.

It should be understood that the actions described in reference to FIG. 9 may not necessarily occur in the described sequence.

Figure 10:
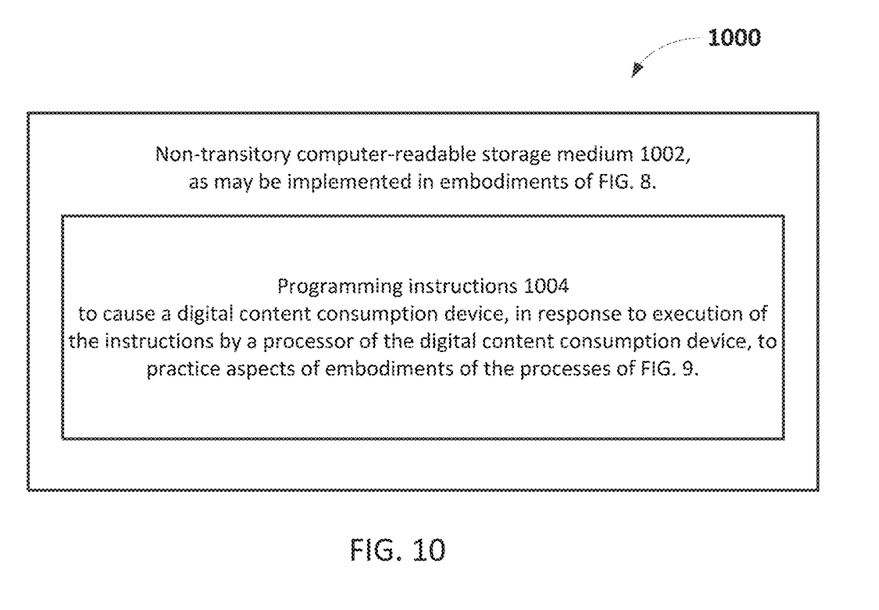
FIG. 10 illustrates an example non-transitory computer-readable storage medium having instructions configured to practice all or selected ones of the operations associated with the processes described in reference to FIGS. 8-9.

FIG. 10 illustrates an example non-transitory computer-readable storage media 1002 having instructions configured to practice all or selected ones of the operations associated with the processes described above. As illustrated, non-transitory computer-readable storage medium 1002 may include a number of programming instructions 1004 (e.g., including height conversion module 850 and region proposal module 852). Programming instructions 1004 may be configured to enable a device, e.g., computing device 800, in response to execution of the programming instructions, to perform one or more operations of the processes described in reference to FIGS. 1-7. In alternate embodiments, programming instructions 1004 may be disposed on multiple non-transitory computer-readable storage media 1002 instead. In still other embodiments, programming instructions 1004 may be encoded in transitory computer-readable signals.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be an apparatus to detect a human, the apparatus comprising: one or more computer processors; an height conversion module, communicatively coupled to the one or more processors, to process an image captured by a camera and to provide a height value for each object of each of a plurality of the pixels of the image, relative to a ground surface; wherein the height conversion module is to extract, from the image, distance values of the objects of the pixels to the camera, and respectively convert the distance values associated with the plurality of pixels of the image to corresponding height values of the objects of the plurality of the pixels of the received image, relative to a ground surface; and a region proposal module, to be loaded into the physical memory and executed by the one or more processors, to identify within the image one or more regions that may depict a person; wherein the region proposal module is to analyze the height values of the objects of the pixels relative to the ground surface, and based on a result of the analysis, output one or more indications of the identified one or more regions.

Example 2 may include the subject matter of Example 1, wherein to identify one or more regions, the region proposal module is to: divide the image into a plurality of cells in a uniform grid; calculate the average height value of each remaining cell; and apply a mean-shift operation to each cell.

Example 3 may include the subject matter of Example 2, wherein to analyze the height values of the objects of the pixels relative to the ground surface, and based on a result of the analysis, output one or more indications of the identified one or more regions, the region proposal module is to: identify one or more candidate regions based at least upon one or more cluster centers identified by the mean-shift operation, wherein the cluster centers represents the local highest regions in the image; validate the one or more candidate regions; and identify the one or more regions based at least upon the validated one or more candidate regions.

Example 4 may include the subject matter of Example 3, wherein each of a subset of the plurality of cells comprises a number of pixels greater than a first threshold value having respective corresponding height values of the objects above a second threshold value, wherein the each of the subset further defines one or more candidate regions.

Example 5 may include the subject matter of Example 3, wherein to validate, the region proposal module is to identify, based at least on a template matching or a learning-based system, whether the one or more candidate regions represents a person.

Example 6 may include the subject matter of Example 5, wherein represents a person comprises represents a head and shoulders combination of a person.

Example 7 may include the subject matter of any Examples 1-6, wherein the region proposal module is to determine the height value for each of the objects of the plurality of pixels of the image using a predetermined map associated with the camera.

Example 8 may include the subject matter of Example 7, wherein the predetermined map is based at least upon a view angle of the camera.

Example 9 may include the subject matter of any Examples 1-6, wherein the camera comprises a 3-D camera.

Example 10 may include the subject matter of any Examples 1-6, wherein the camera is set to a view angle selected from a plurality of settable view angles.

Example 11 may be computer implemented method to detect a human, comprising: receiving, by a computing device, an image captured by a camera, wherein the image includes a distance value for each of the plurality of the objects of the pixels of the image to the camera; extracting, by the computing device, distance values of the objects of the pixels to the camera; respectively converting, by the computing device, the distance values associated with the plurality of objects of the pixels of the image to corresponding height values for the plurality of the objects of the pixels of the image relative to a ground surface; analyzing, by the computing device, the height values of the objects of the pixels relative to the ground surface; identifying, by the computing device, based on the analysis, one or more regions within the image that may depict a person; and outputting, by the computing device, one or more indications of the identified one or more regions.

Example 12 may include the subject matter of Example 11, wherein identifying one or more regions further comprises: dividing, by the computing device, the image into a plurality of cells in a uniform grid; calculating, by the computing device, the average height value of each remaining cell; and applying, by the computing device, a mean-shift operation to each cell.

Example 13 may include the subject matter of Example 12, wherein analyzing the height values of the objects of the pixels relative to the ground surface further comprises: identifying one or more candidate regions based at least upon one or more cluster centers identified by the mean-shift operation, wherein the cluster centers represents the local highest regions in the image; validating the one or more candidate regions; and identifying the one or more regions based at least upon the validated one or more candidate regions.

Example 14 may include the subject matter of Example 13, wherein each of a subset of the plurality of cells comprises a number of pixels greater than a first threshold value having respective corresponding height values above a second threshold value, wherein the each of the subset further defines one or more candidate regions.

Example 15 may include the subject matter of Example 13, wherein validating the one or more candidate regions further comprises identifying, by the computing device, based at least on template matching, whether the one or more candidate regions is representing a person.

Example 16 may include the subject matter of Example 15, wherein representing a person comprises representing a head and shoulders combination of a person.

Example 17 may include the subject matter of any Examples 11-16, wherein respectively converting the distance values to corresponding height values further comprises determining the height value for each of the objects of the plurality of pixels of the image using a conversion map associated with the camera.

Example 18 may include the subject matter of Example 17, wherein the conversion map is based at least upon a view angle of the camera.

Example 19 may include the subject matter of Example 18, wherein the camera is set to a view angle selected from a plurality of settable view angles.

Example 20 may include the subject matter of any Examples 11-16, wherein the camera comprises a 3-D camera.

Example 21 may be one or more computer-readable media comprising instructions that cause a computing device, in response to execution of the instructions by the computing device, to: receive, by a computing device, an image captured by a camera, wherein the image includes a distance value for each of the plurality of the objects of the pixels of the image to the camera; extract, by the computing device, distance values of the objects of the pixels to the camera; respectively convert, by the computing device, the distance values associated with the plurality of objects of the pixels of the image to corresponding height values for the plurality of the objects of the pixels of the image relative to a ground surface; analyze, by the computing device, the height values of the objects of the pixels relative to the ground surface; identify, by the computing device, based on the analysis, one or more regions within the image that may depict a person; and output, by the computing device, one or more indications of the identified one or more regions.

Example 22 may include the subject matter of Example 21, wherein identify one or more regions further comprises to: divide, by the computing device, the image into a plurality of cells in a uniform grid; calculate, by the computing device, the average height value of each remaining cell; and apply, by the computing device, a mean-shift operation to each cell.

Example 23 may include the subject matter of Example 22, wherein analyze the height values of the objects of the pixels relative to the ground surface further comprises to: identify one or more candidate regions based at least upon one or more cluster centers identified by the mean-shift operation, wherein the cluster centers represents the local highest regions in the image; validate the one or more candidate regions; and identify the one or more regions based at least upon the validated one or more candidate regions.

Example 24 may include the subject matter of Example 23, wherein each of a subset of the plurality of cells comprises a number of pixels greater than a first threshold value having respective corresponding height values above a second threshold value, wherein the each of the subset further defines one or more candidate regions.

Example 25 may include the subject matter of Example 23, wherein to validate the one or more candidate regions further comprises to identify, by the computing device, based at least on template matching, whether the one or more candidate regions is representing a person.

Example 26 may include the subject matter of Example 25, wherein representing a person comprises representing a head and shoulders combination of a person.

Example 27 may include the subject matter of any Examples 21-26, wherein to respectively convert the distance values to corresponding height values further comprises to determine the height value for each of the objects of the plurality of pixels of the image using a conversion map associated with the camera.

Example 28 may include the subject matter of Example 27, wherein the conversion map is based at least upon a view angle of the camera.

Example 29 may include the subject matter of Example 28, wherein the camera is set to a view angle selected from a plurality of settable view angles.

Example 30 may include the subject matter of any Examples 21-26, wherein the camera comprises a 3-D camera.

Example 31 may include the subject matter of any of Examples 21-30, wherein the computer-readable media is transitory or non-transitory.

Example 32 may be an apparatus to detect a human, the apparatus comprising: means for receiving an image captured by a camera, wherein the image includes a distance value for each of the plurality of the objects of the pixels of the image to the camera; means for extracting distance values of the objects of the pixels to the camera; means for respectively converting the distance values associated with the plurality of objects of the pixels of the image to corresponding height values for the plurality of the objects of the pixels of the image relative to a ground surface; means for analyzing the height values of the objects of the pixels relative to the ground surface; means for identifying, based on the analysis, one or more regions within the image that may depict a person; and means for outputting one or more indications of the identified one or more regions.

Example 33 may include the subject matter of Example 32, wherein identifying one or more regions further comprises: means for dividing the image into a plurality of cells in a uniform grid; means for calculating the average height value of each remaining cell; and means for applying a mean-shift operation to each cell.

Example 34 may include the subject matter of Example 33, wherein analyzing the height values of the objects of the pixels relative to the ground surface further comprises: means for identifying one or more candidate regions based at least upon one or more cluster centers identified by the mean-shift operation, wherein the cluster centers represents the local highest regions in the image; means for validating the one or more candidate regions; and means for identifying the one or more regions based at least upon the validated one or more candidate regions.

Example 35 may include the subject matter of Example 34, wherein each of a subset of the plurality of cells comprises a number of pixels greater than a first threshold value having respective corresponding height values above a second threshold value, wherein the each of the subset further defines one or more candidate regions.

Example 36 may include the subject matter of Example 34, wherein means for validating the one or more candidate regions further comprises means for identifying, based at least on template matching, whether the one or more candidate regions is representing a person.

Example 37 may include the subject matter of Example 36, wherein representing a person comprises means for representing a head and shoulders combination of a person.

Example 38 may include the subject matter of any Examples 32-37, wherein means for respectively converting the distance values to corresponding height values further comprises means for determining the height value for each of the objects of the plurality of pixels of the image using a conversion map associated with the camera.

Example 39 may include the subject matter of Example 38, wherein the conversion map is based at least upon a view angle of the camera.

Example 40 may include the subject matter of Example 39, wherein the camera is set to a view angle selected from a plurality of settable view angles.

Example 41 may include the subject matter of any Examples 32-37, wherein the camera comprises a 3-D camera.

What is claimed is:

1. An apparatus to detect a person, the apparatus comprising:
   one or more computer processors; and
   a region proposal module, communicatively coupled to the one or more processors, to identify within an image one or more regions that may depict a person; wherein the region proposal module is to:
     divide the image into a plurality of cells in a uniform grid;
     calculate an average height value of each cell;
     apply a mean-shift operation to each cell;
     identify one or more candidate regions based at least upon one or more cluster centers identified by the mean-shift operation, wherein the cluster centers represent local highest regions in the image;
     validate the one or more candidate regions; and
     output one or more indications of the identified one or more regions.

2. The apparatus of claim 1, wherein each of a subset of the plurality of cells comprises a number of pixels greater than a first threshold value having respective corresponding height values above a second threshold value, wherein the each of the subset further defines one or more candidate regions.

3. The apparatus of claim 1, wherein to validate, the region proposal module is to identify, based at least on a template matching or a learning-based system, whether the one or more candidate regions represents a person.

4. The apparatus of claim 3, wherein represents a person comprises represents a head and shoulders combination of a person.

5. The apparatus of claim 1, wherein the region proposal module is to determine a height value for each of objects of a plurality of pixels of the image using a predetermined map associated with a camera.

6. The apparatus of claim 5, wherein the predetermined map is based at least upon a view angle of the camera.

7. The apparatus of claim 6, wherein the camera comprises a 3-D camera.

8. The apparatus of claim 1, wherein a camera is set to a view angle selected from a plurality of settable view angles.

9. The apparatus of claim 1, further comprising a height conversion module, communicatively coupled to the one or more processors, to process an image captured by a camera and to provide a height value for each object associated, respectively, by a plurality of pixels of the image, relative to a ground surface; wherein the height conversion module is to extract, from the image, distance values of the objects of the pixels to the camera, and respectively convert the distance values associated with the plurality of pixels of the image to corresponding height values of the objects of the plurality of the pixels of the received image, relative to a ground surface.

10. A computer implemented method to detect a person, comprising:
   receiving, by a computing device, an image captured by a camera, wherein the image includes a distance value for each of pixels of the image, respectively, associated with a plurality of objects to the camera;
   extracting, by the computing device, distance values of the objects of the pixels to the camera;
   respectively converting, by the computing device, the distance values associated with the plurality of objects of the pixels of the image to corresponding height values for the plurality of the objects of the pixels of the image relative to a ground surface;
   analyzing, by the computing device, the height values of the objects of the pixels relative to the ground surface;
   dividing, by the computing device, the image into a plurality of cells in a uniform grid;
   calculating, by the computing device, an average height value of each cell;
   applying, by the computing device, a mean-shift operation to each cell;
   identifying, by the computing device, one or more regions within the image that may depict a person; and
   outputting, by the computing device, one or more indications of the identified one or more regions.

11. One or more non-transitory computer-readable media comprising instructions that cause a computing device, in response to execution of the instructions by the computing device, to:
- receive, by a computing device, an image captured by a camera;
- divide, by the computing device, the image into a plurality of cells in a uniform grid;
- calculate, by the computing device, an average height value of each cell;
- apply, by the computing device, a mean-shift operation to each cell;
- identify one or more candidate regions based at least upon one or more cluster centers identified by the mean-shift operation, wherein the cluster centers represent local highest regions in the image;
- identify one or more regions based at least upon a validated one or more candidate regions; and
- output, by the computing device, one or more indications of the identified one or more regions.

12. The one or more non-transitory computer-readable media of claim 11, wherein each of a subset of the plurality of cells comprises a number of pixels greater than a first threshold value having respective corresponding height values above a second threshold value, wherein the each of the subset further defines one or more candidate regions.

13. The one or more non-transitory computer-readable media of claim 11, wherein to validate the one or more candidate regions further comprises to identify, by the computing device, based at least on template matching, whether the one or more candidate regions is representing a person.

14. The one or more non-transitory computer-readable media of claim 13, wherein representing a person comprises representing a head and shoulders combination of a person.

15. The one or more non-transitory computer-readable media of claim 11, wherein to respectively convert the distance values to corresponding height values further comprises to determine a height value for each object associated with a plurality of pixels of the image using a conversion map associated with the camera.

16. The one or more non-transitory computer-readable media of claim 15, wherein the conversion map is based at least upon a view angle of the camera.

17. The one or more non-transitory computer-readable media of claim 11, wherein the image includes a distance value for each of a plurality of objects associated, respectively, with pixels of the image to the camera, and the computing device is further caused to extract distance values of the plurality of objects associated, respectively, with the pixels to the camera; and respectively convert the distance values associated with the plurality of objects of the pixels of the image to corresponding height values for the plurality of the objects of the pixels of the image relative to a ground surface.

18. An apparatus to detect a person, the apparatus comprising:
- means for receiving an image captured by a camera, wherein the image includes a distance value for a plurality of objects associated, respectively, with pixels of the image to the camera;
- means for extracting distance values of the objects of the pixels to the camera;
- means for respectively converting the distance values associated with the plurality of objects of the pixels of the image to corresponding height values for the plurality of the objects of the pixels of the image relative to a ground surface;
- means for dividing the image into a plurality of cells in a uniform grid;
- means for calculating an average height value of each cell;
- means for applying a mean-shift operation to each cell;
- means for identifying one or more candidate regions based at least upon one or more cluster centers identified by the mean-shift operation, wherein the cluster centers represent local highest regions in the image;
- means for validating the one or more candidate regions;
- means for identifying one or more regions based at least upon the validated one or more candidate regions;
- means for analyzing the height values of the objects of the pixels relative to the ground surface;
- means for identifying, based on the analysis, one or more regions within the image that may depict a person; and
- means for outputting one or more indications of the identified one or more regions.

19. The apparatus of claim 18, wherein each of a subset of the plurality of cells comprises a number of pixels greater than a first threshold value having respective corresponding height values above a second threshold value, wherein the each of the subset further defines one or more candidate regions.

20. The apparatus of claim 19, wherein means for validating the one or more candidate regions further comprises means for identifying, based at least on template matching, whether the one or more candidate regions is representing a person.

* * * * *